W. A. LONG.
CRANKING DEVICE FOR AUTOMOBILES
APPLICATION FILED OCT. 12, 1910.

995,613.

Patented June 20, 1911.

2 SHEETS—SHEET 1.

Witnesses
Edwin F. McKie
Wm Bagger

Inventor
Winfield A. Long

By Victor J. Evans
Attorney

W. A. LONG.
CRANKING DEVICE FOR AUTOMOBILES.
APPLICATION FILED OCT. 12, 1910.
995,613.
Patented June 20, 1911.
2 SHEETS—SHEET 2.
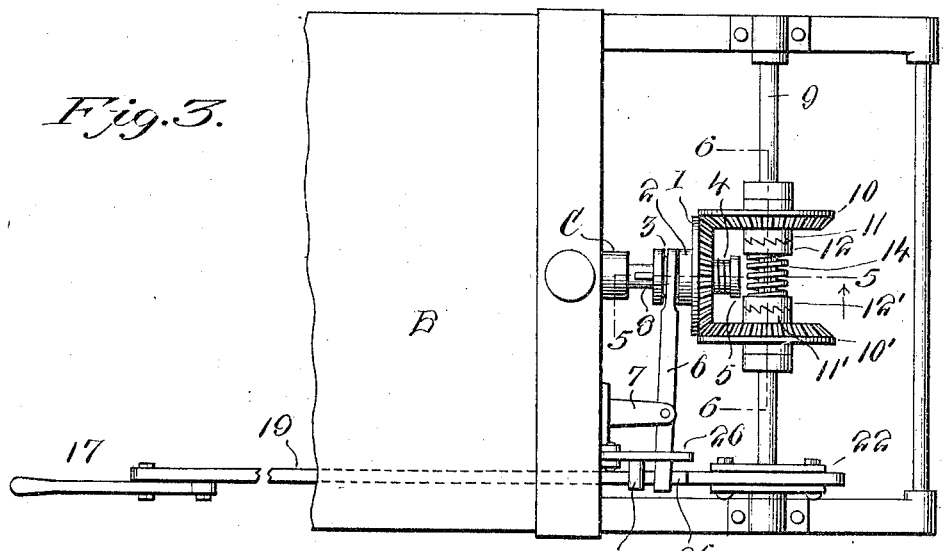
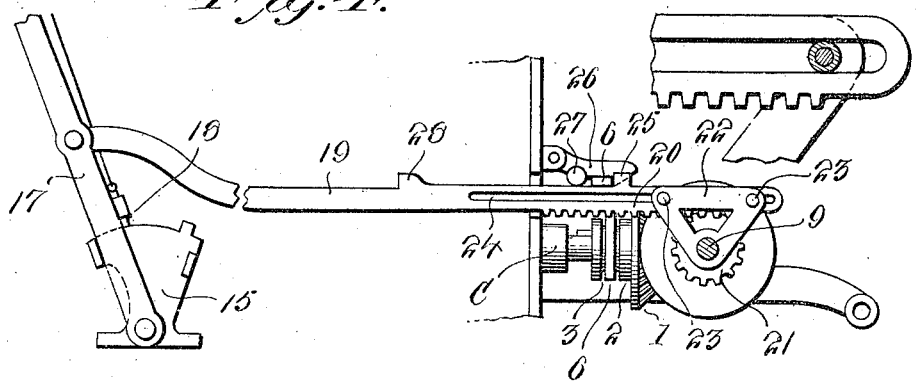
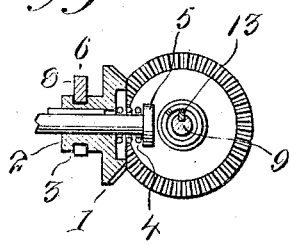
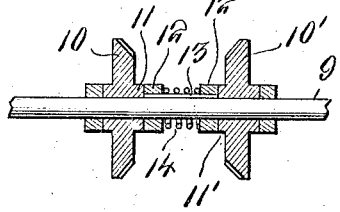
Witnesses
Edwin F. McKee
Wm. Bagger
Inventor
Winfield A. Long
By Victor J. Evans
Attorney

UNITED STATES PATENT OFFICE.

WINFIELD A. LONG, OF BALTIMORE, MARYLAND.

CRANKING DEVICE FOR AUTOMOBILES.

995,613.

Specification of Letters Patent. Patented June 20, 1911.

Application filed October 12, 1910. Serial No. 586,780.

*To all whom it may concern:*

Be it known that I, WINFIELD A. LONG, a citizen of the United States of America, residing at Baltimore city, in the State of Maryland, have invented new and useful Improvements in Cranking Devices for Automobiles, of which the following is a specification.

This invention relates to cranking devices for automobiles, and it has for its object to provide simple and efficient means whereby the operator may crank the engine of an automobile without leaving his seat.

A further object of the invention is to provide a cranking device which is equally applicable with little or no structural change to various forms of automobiles or motor vehicles for the purpose of cranking the engines of the same.

A further object of the invention is to produce a device of the class described which shall be simple in construction and thoroughly efficient in operation.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

Figure 1:
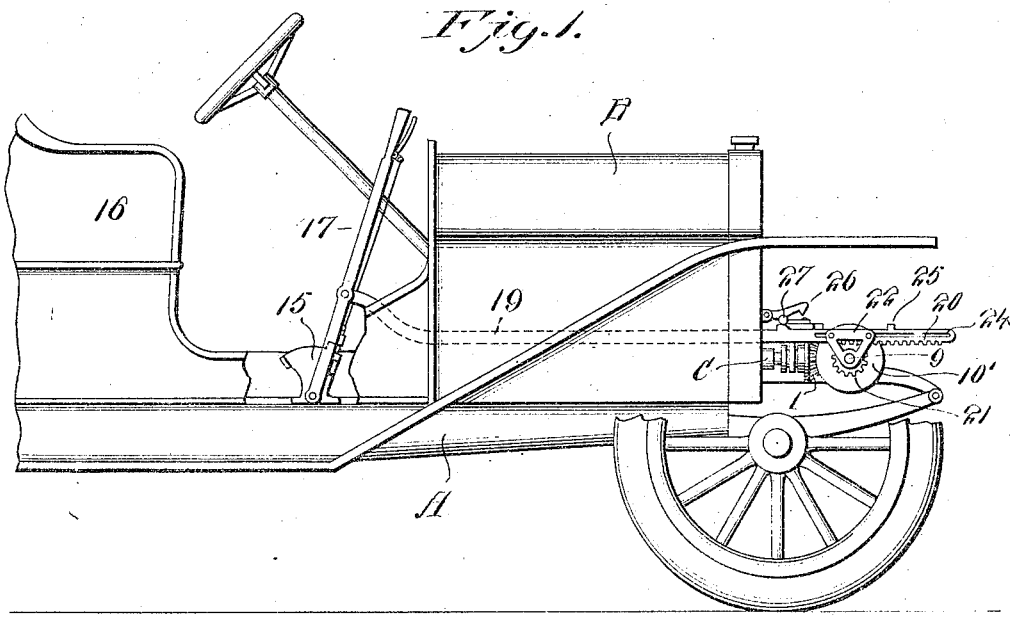
Figure 2:
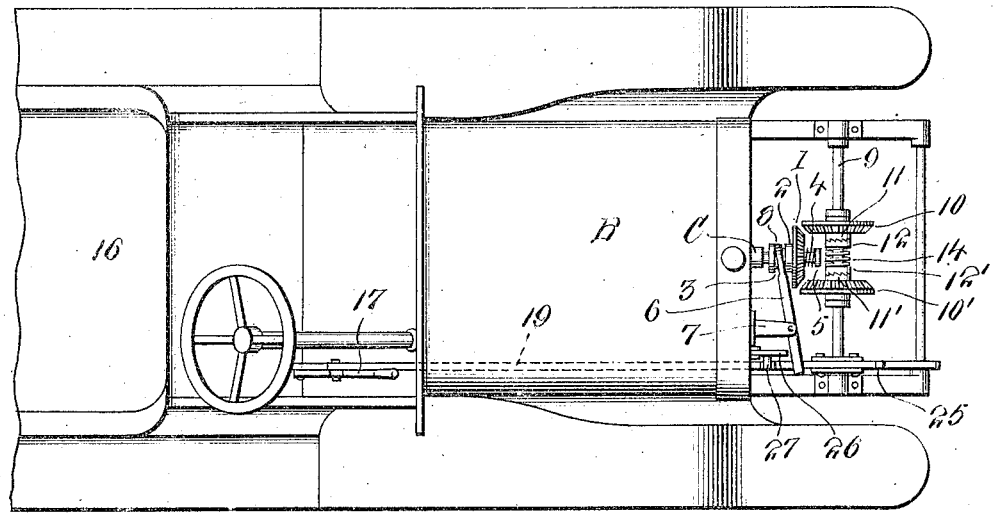

In the drawings,—Figure 1 is a side elevation showing a portion of an automobile to which the invention has been applied. Fig. 2 is a top plan view of the same. Fig. 3 is a top plan view showing the cranking device in mesh and ready for operation. Fig. 4 is a detail side elevation, showing the mechanism in position to begin cranking. Fig. 5 is a sectional detail view taken on the line 5—5 in Fig. 3. Fig. 6 is a sectional detail view taken on the line 6—6 in Fig. 3. Fig. 7 is a detail view in side elevation and partly in section of the forward portion of a rack bar and a portion of the guide frame.

Corresponding parts in the several figures are denoted by like characters of reference.

Upon the forward portion of an automobile body, a portion of which is shown at A, is mounted the engine hood B. The engine shaft C carries a slidably supported bevel pinion 1, the hub of which, 2, engages a reduced portion of the engine shaft for rotation therewith, said hub being provided with an annular groove 3. The pinion 1 is normally forced in a rearward direction by the action of a spring 4 interposed between said pinion and a nut or head 5 upon the front of the engine shaft. A shipping lever 6 fulcrumed upon a frame or bracket 7 has a bifurcated end 8 engaging the groove 3 in the hub of the pinion 1, which latter may thus be moved forward against the tension of the spring 4. A cross shaft 9, which is supported for rotation adjacent to and in front of the engine shaft, carries two loosely mounted opposed bevel pinions 10, 10' having oppositely beveled clutch members 11, 11' adapted to engage clutch collars 12, 12' which are slidably mounted upon the shaft 9 for rotation therewith, said shaft being provided with a portion which is non-circular or provided with a key or feather 13, as shown in Fig. 6. A spring 14 interposed between the slidable clutch members 12, 12' serves to hold said clutch members normally in engagement with the corresponding clutch members upon the bevel pinions 10, 10'.

It is obvious that when the shaft 9 is rotated in one direction, the clutch member 12 will engage the clutch member 11 upon the pinion 10 which will thus be rotated with the shaft, while the clutch member 12' will slide idly over the clutch member 11' upon the pinion 10'. When the shaft is rotated in the opposite direction, the clutch member 12' will become active and the clutch member 12 will become idle.

Upon a lever stand 15 in proximity to the driver's seat 16 is mounted a lever 17 having a stop 18 whereby its throw or movement may be limited. Pivotally connected with the lever 17 is a rod or bar 19 having a toothed portion forming a rack 20 that meshes with a pinion 21 upon the shaft 9. Pivoted upon the shaft 9 is a guide frame 22 having guide rollers 23 extending through and engaging a slot 24 in the rack bar which is thereby held in engagement with the pinion 21. The bar 19 is provided near its front end with a lug 25 adapted when the rack bar is moved in a rearward direction to engage the shipping lever 6 and to actuate the latter so as to move the bevel pinion 1 against the tension of the spring 4.

Pivoted upon the engine hood or casing 15 is a pawl or dog 26 adapted to engage the shipping lever for the purpose of retaining the pinion operated thereby in projected position in engagement with the bevel pinions 10, 10', as clearly seen in Figs. 3 and 4. The pawl or dog 26 is provided with a laterally extending pin 27 lying in the path of a beveled lug 28 which projects from the bar 19 a suitable distance in rear of the lug 25. When the bar 19 is moved a sufficient distance in a forward direction, the beveled lug will engage the finger 27 and trip the pawl 26, thus releasing the shipping lever 6 and permitting the bevel pinion 1 to be restored to its initial position out of engagement with the pinions 10, 10' by the action of the spring 4.

From the foregoing description, taken in connection with the drawings hereto annexed, the operation and advantages of this invention will be readily understood. Normally, the bevel pinion 1 is out of engagement with the pinions 10, 10', and the bar 19 actuated by the operating lever 17 will be at the forward end of its throw. When it is desired to crank the engine, the lever 17 is actuated to move the bar 19 rearwardly until the lug 25 engages the shipping lever 6 and places the latter in engagement with the retaining pawl 26. The bar 19 may now be reciprocated, causing the rack portion 20 to engage the pinion 21 of the shaft 9 and to oscillate the latter, thus causing the pinions 10, 10', to alternately actuate the engine shaft through the medium of the pinion 1. As soon as the ignition has been started, the bar 19 is pushed forward until the beveled lug 28 engages the pin 27, thereby tripping the pawl 26 and releasing the shipping lever, thus causing the pinion 1 to become disengaged from the pinions 10, 10'. The pawl 26 may be an ordinary gravity pawl, or a spring may be provided when desired to actuate the same.

From the foregoing description, it will be seen that this improved device is not only simple in construction and capable of being readily applied to various types of automobiles, but that it will operate equally well without regard to the elevation at which the engine is located. If necessary, the bar 19 might be disposed below the engine shaft and the cross shaft 9, such arrangement being practically nothing more than an inversion of the arrangement herein shown and described.

Having thus described the invention, what is claimed as new, is:—

1. In a cranking device for automobiles, an engine shaft, a spring-actuated bevel pinion mounted slidably upon said shaft, a shipping lever to actuate the bevel pinion, a counter shaft, clutch-actuated bevel pinions to actuate the engine shaft pinion constantly in one direction when the counter shaft is oscillated, means for oscillating the counter shaft, and means for engaging the shipping lever to retain the latter when the pinion upon the engine shaft is projected against the tension of its actuating spring.

2. In a cranking device for automobiles, an engine shaft, a spring actuated bevel pinion upon the shaft, a counter shaft, opposed bevel pinions upon said shaft, said pinions being provided upon said opposed faces with clutch members, a spring-actuated clutch slidably engaging the shaft intermediate the bevel pinions and adapted to rotate said bevel pinions alternately when the shaft is oscillated, means for oscillating the shaft, a shipping lever engaging the bevel pinion upon the engine shaft to project the latter against the tension of its actuating spring into mesh with the bevel pinions on the counter shaft, and means for engaging the shipping lever to retain the bevel pinion in projected position upon the engine shaft.

3. In a cranking device for automobiles, an engine shaft having a slidably supported spring pressed bevel pinion, a counter shaft having opposed loosely supported bevel pinions adapted to mesh with the pinion upon the engine shaft when the latter is projected against the tension of its actuating spring, clutch means upon the counter shaft to alternately engage and actuate the opposed pinions when said shaft is oscillated, a pinion upon said shaft, a rack bar meshing with said pinion, means for reciprocating the rack bar, a shipping lever engaging the bevel pinion upon the engine shaft to project said pinion against the tension of its actuating spring, a pawl supported in the path of the shipping lever, a lug upon the rack bar to engage the shipping lever to move the latter into engagement with the pawl, and a lug upon the rack bar adapted to trip the pawl to disengage the shipping lever.

4. In a cranking device for automobiles, a counter shaft, opposed pinions upon said counter shaft, clutch means to actuate the pinions in opposite directions when the counter shaft is oscillated, an engine shaft, a spring pressed pinion slidable upon said shaft, a shipping lever to project the pinion upon the engine shaft against the tension of its actuating spring into engagement with the pinions upon the counter shaft, a pawl to retain the shipping lever with the pinion in projected position, and means for imparting an oscillatory motion to the counter shaft including a pinion upon said shaft, a rack bar supported for reciprocation and meshing with the pinion; said rack bar being provided with a lug to engage the shipping lever to move the latter into engagement with the pawl and with a second lug to trip the pawl.

In testimony whereof I affix my signature in presence of two witnesses.

WINFIELD A. LONG.

Witnesses:
WM. BAGGER,
H. DITTMAN.

---

Copies of this patent may be obtained for five cents each, by addressing the "Commissioner of Patents, Washington, D. C."